June 8, 1926.
B. J. CARTER
CLAMP
Filed March 24, 1925
1,587,820
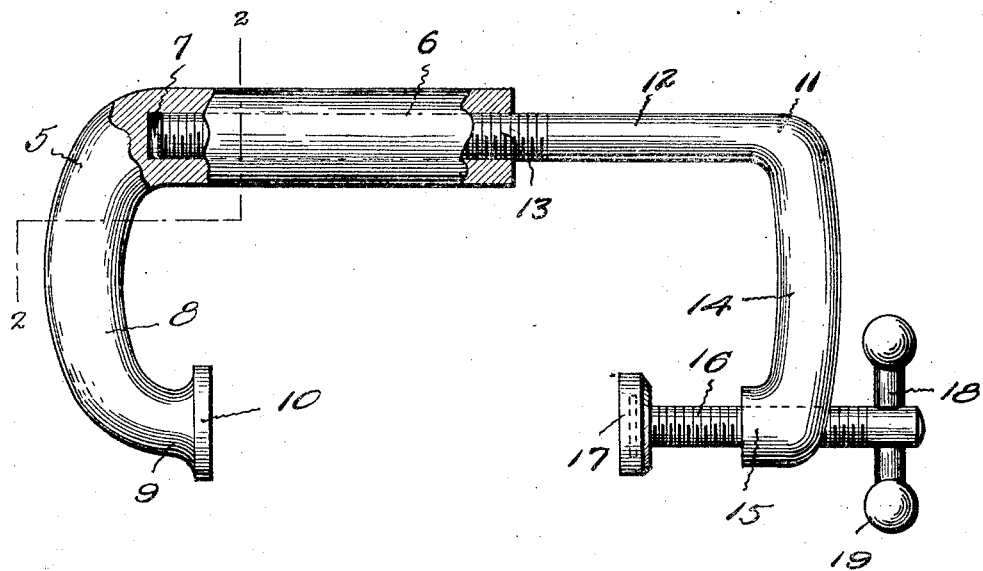
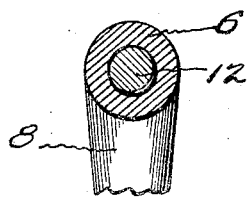
INVENTOR.
BERNARD J. CARTER
BY
ATTORNEY.

Patented June 8, 1926.

1,587,820

UNITED STATES PATENT OFFICE.

BERNARD J. CARTER, OF KISSIMMEE, FLORIDA.

CLAMP.

Application filed March 24, 1925. Serial No. 18,014.

This invention relates to improvements in clamping devices.

An important object of the invention is to provide a clamp having a double adjustment whereby the work may be tightly and accurately held in position.

A further object of the invention is the provision of a clamp of the above character which may be very accurately adjusted.

A still further object of the invention is the provision of a clamping device of the above kind which is comparatively simple yet very durable of construction and efficient for the purpose intended.

Other objects and advantages of this invention will become apparent as the description progresses.

In the accompanying drawing forming a part of this specification and in which like numerals are employed to designate corresponding parts throughout the same:

Figure 1 is a side elevation of the device comprising my invention partially broken away to illustrate the interior construction, and Figure 2 is a transverse sectional view taken on the line 2—2 of Figure 1.

In the drawing, wherein for the purpose of illustration is shown the preferred embodiment of my invention, the numeral 5 generally indicates the main bracket member which comprises a longitudinal cylindrical body 6 provided with an internally screw threaded bore 7. Formed integral with the body and extending substantially right angular thereto is a tapered arm 8 carrying upon the opposite end thereof an angular projecting lug 9. The extremity of the lug 9 is provided with a circular engaging plate 10 somewhat larger in diameter than the lug to provide a substantial gripping surface.

Adjustably associated with the main bracket 5 is an auxiliary bracket 11 consisting of a longitudinal rod 12 circular in cross section and provided upon one portion thereof with external threads 13 engageable with the threaded bore 7. Formed integral with the rod 12 and extending substantially at right angles from the opposite extremity thereof is an auxiliary bracket arm 14 preferably heavier in construction than the rod member and provided on the end thereof with an angular boss 15 extending in parallel alignment with the rod 12.

It is obvious from the foregoing description that the main and auxiliary brackets 5 and 11 may be relatively adjusted by reverse rotary movement of the arm members increasing or lessening the distance between the plate 10 and boss 15 for engagement of suitable work. It is readily apparent however, that this relative movement of the main and auxiliary brackets will not provide sufficient adjustment for firmly engaging the work as a complete rotation of one of the brackets relative to the other is necessary to bring the contacting surfaces in alignment.

It is therefore desirable to provide auxiliary adjusting means whereby the final engaging or clamping process may be accurately accomplished. With this in mind, one extremity of the auxiliary arm 14, upon which is formed the boss 15, is provided with an internally screw threaded bore which engages an externally screw threaded bolt 16 threadedly mounted in the bore. The inner extremity of the bolt 16 carries a swivel head 17 rotatably mounted upon a suitable projection formed on the bolt for engagement with the work. Adjacent the opposite or outer extremity of the bolt 16 is a transversely positioned bar 18 provided at each extremity with spherical knobs 19 to permit convenient operation thereof.

In use, the work engaging member comprising the plate 10 and the swivel head 17 are first adjusted by rotary movement of the main and auxiliary brackets which will place these elements adjacent the work to be clamped. Final adjustment is then made by rotation of the bolt 16 relative to the auxiliary bracket. It is thus obvious that very fine adjustment of the clamp may be made without in any manner weakening the structure thereof. It will be noted that many clamping devices employing only a single adjusting unit have a tendency to permit movement of the contacting members, whereby the work is thrown out of alignment. This is due to a large extent to the comparatively long movement of the adjusting member necessary to adapt the device upon work of various sizes. With my improved device it is apparent that each adjusting element bears a portion of the clamp movement and by this division of the clamp adjusting means the contacting members are retained in direct alignment.

It is to be understood that the form of my invention herewith shown and described is to be taken as the preferred example of the same, and that various changes as to the shape, size and arrangement of parts may be resorted to without departing from the spirit of the invention, or the scope of the subjoined claims.

Having thus described my invention, I claim:

1. In a clamp of the class described, a main bracket including a body having an internally threaded bore, an angular arm formed on the said body, and a projection formed on the opposite end of the arm extending parallel with the said body; an auxiliary bracket including a rod externally threaded on one extremity thereof, an angular arm formed on the opposite extremity of the rod, a boss extending in alignment with the rod formed on the opposite end of the arm, the said bracket being adjustable by rotation of the said rod within the internally threaded bore, auxiliary adjusting means including a bolt threadedly mounted upon the auxiliary arm extension, a swivel head mounted on the bolt and means for readily actuating the said bolt.

2. In a clamp of the class described, a main bracket including a longitudinal body provided with an internally threaded bore, an angular arm formed on the said body, a projecting lug formed on the opposite end of the arm provided with a plate, an auxiliary bracket including a longitudinal rod externally threaded on one extremity, the said rod being engageable with the bore formed in the main bracket body, an arm formed on the opposite end of the arm provided with an internally threaded bore, a bolt threadedly engageable with the said bore, a swivel head mounted on the inner end of the said bolt, and a transverse actuating bar formed on the opposite end of the said bolt.

3. A clamp comprising a main bracket of angular formation, one leg of the said bracket being provided with an internally screw threaded bore, and an angular lug formed on the end of the opposite leg, an auxiliary bracket of angular formation, one leg thereof being externally screw threaded for engagement with the bore formed in the main bracket, an angular lug formed on the end of the opposite leg of the auxiliary bracket arranged in alignment with the lug formed on the main bracket, and an auxiliary adjusting means mounted in the end of the auxiliary bracket including a rotatable bolt adapted for longitudinal adjustment.

4. A clamp comprising a main bracket of angular formation, one leg of the bracket being provided with an internally screw threaded bore, and an angular lug formed on the end of the opposite leg; an auxiliary bracket of angular formation, one leg thereof being externally screw threaded for threaded engagement with the bore formed in the main bracket, a lug formed on the end of the opposite leg of the auxiliary bracket arranged in alignment with the lug formed on the main bracket; and auxiliary adjusting means including an externally screw threaded bolt threadedly mounted in the end of the auxiliary bracket adjustable toward and away from the lug formed on the main bracket and means for readily rotating the said bolt.

In testimony whereof I affix my signature.

BERNARD J. CARTER.